(12) United States Patent
Vincent et al.

(10) Patent No.: US 9,052,454 B2
(45) Date of Patent: Jun. 9, 2015

(54) SPECTRAL BAND-PASS FILTER HAVING HIGH SELECTIVITY AND CONTROLLED POLARIZATION

(75) Inventors: Grégory Vincent, Massy (FR); Riad Haidar, Paris (FR); Stéphane Collin, Paris (FR); Jean-Luc Pelouard, Paris (FR)

(73) Assignees: Centre Nationale de la Recherche Scientifique-CNRS, Paris (FR); Office National d'Etudes et de Recherches Aérospatiales-ONERA, Chatillon (FR)

( * ) Notice: Subject to any disclaimer, the term of this patent is extended or adjusted under 35 U.S.C. 154(b) by 166 days.

(21) Appl. No.: 13/824,807

(22) PCT Filed: Sep. 15, 2011

(86) PCT No.: PCT/EP2011/066029
§ 371 (c)(1),
(2), (4) Date: May 14, 2013

(87) PCT Pub. No.: WO2012/035110
PCT Pub. Date: Mar. 22, 2012

(65) Prior Publication Data
US 2013/0228687 A1 Sep. 5, 2013

(30) Foreign Application Priority Data
Sep. 17, 2010 (FR) ..................... 10 57449

(51) Int. Cl.
*G02B 5/18* (2006.01)
*G01J 3/28* (2006.01)
(Continued)

(52) U.S. Cl.
CPC ................. *G02B 5/203* (2013.01); *B82Y 20/00* (2013.01); *G02B 5/1809* (2013.01); *G02B 5/201* (2013.01); *G02B 5/204* (2013.01); *G02B 2207/101* (2013.01); *G01J 3/28* (2013.01)

(58) Field of Classification Search
CPC ..... B82Y 20/00; G01J 3/28; G02B 2207/101; G02B 5/1809; G02B 5/201; G02B 5/203; G02B 5/204
USPC ........ 250/339.01; 359/489.19, 558, 568, 589, 359/590
See application file for complete search history.

(56) References Cited

U.S. PATENT DOCUMENTS 5,726,805 A 3/1998 Kaushik et al.

FOREIGN PATENT DOCUMENTS

JP 62-293223 A 12/1987
WO 2005/017570 A2 2/2005
(Continued)

OTHER PUBLICATIONS

International Search Report issued in PCT/EP2011/066029 mailed on Nov. 23, 2011 (6 pages).
(Continued)

*Primary Examiner* — Mark R Gaworecki
(74) *Attorney, Agent, or Firm* — Osha Liang LLP

(57) ABSTRACT

According to one aspect, the invention relates a spectral band-pass filter, which is optimized for the transmission of an incident wave at at least a first given central wavelength $\lambda_0$, and which includes: a metal grating having a thickness (t) greater than approximately $\lambda_0/50$ and including at least a first set of substantially identical, parallel slots having a width (W) less than around $\lambda_0/10$, and being spaced apart periodically or quasi-periodically according to a first period that is less than said first central wavelength, a layer of dielectric material having a thickness (h) and a given refractive index ($n_g$), which is coupled to the metal grating to form a waveguide for the waves diffracted by the grating, said first period of the grating being designed such that only orders 0 and ±1 of a wave having normal incidence and a wavelength $\lambda_0$ are diffracted in the layer of dielectric material, the assembly of the dielectric layer and grating being suspended, during use, in a fluid having a refractive index of close to 1.

20 Claims, 7 Drawing Sheets

(51) Int. Cl.
 G02B 5/20 (2006.01)
 B82Y 20/00 (2011.01)

(56) References Cited

FOREIGN PATENT DOCUMENTS

| WO | 2007/118895 A1 | 10/2007 |
| WO | 2008/073439 A2 | 6/2008 |
| WO | 2008/122431 A2 | 10/2008 |

OTHER PUBLICATIONS

Written Opinion of the International Searching Authority issued in PCT/EP2011/066029 mailed on Nov. 23, 2011 (5 pages).

International Preliminary Report on Patentability from PCT/EP2011/066029 issued on Sep. 17, 2012 (5 pages).

SPECTRAL BAND-PASS FILTER HAVING HIGH SELECTIVITY AND CONTROLLED POLARIZATION

PRIOR ART

1. Technical Field of the Invention

The present invention relates to a spectral filter having high selectivity and controlled polarization, especially for the production of filters in the infrared.

2. Prior Art

A known conventional technique for carrying out a bandpass filtering function consists in stacking thin layers, taking care to choose the number, the thicknesses of the layers and the nature of the materials as a function of the template desired for the filter. Patent application WO2008122431 describes for example such a filter, termed an interferential filter. However, once they involve a large number of thin layers, these hardware components exhibit brittleness as soon as they are subjected to cycles of temperature variations, for example when they are disposed in a cryostat, especially for applications in the infrared. Indeed, these cycles lead to destruction of the structure owing to the thermal expansion coefficients which, differing from one material to another and therefore from one layer to another, induce stresses. Furthermore, a filter operating in the infrared will require thicker layers than a filter operating in the visible, and thickness-related technological difficulties will arise very rapidly, said difficulties being made worse during the production of arrays of filters, wherein it will be necessary to vary the thicknesses from one filter to another.

Moreover, for certain applications, especially thermal detection, it may be beneficial to be able to analyze the polarization of the incident wave so as to distinguish the type of object detected. Hardware components based on the technology of the stacking of thin layers do not allow polarization-dependent selectivity.

It is also known to associate with a thin layer a dielectric grating (see for example U.S. Pat. No. 5,726,805). This technique exhibits the advantage of using only a single layer but a filter produced by this technology can be nothing but bandstop when it is used in transmission.

An object of the invention consists in proposing a spectral filter that is bandpass when it is used in transmission, which exhibits strong wavelength-selectivity while allowing control of polarization.

SUMMARY OF THE INVENTION

According to a first aspect, the invention relates to a bandpass spectral filter, optimized for the transmission of an incident wave at at least one first given central wavelength $\lambda_0$, comprising a metallic grating of thickness greater than about $\lambda_0/50$ and comprising at least one first assembly of substantially identical, parallel slits of width smaller than about $\lambda_0/10$, spaced apart in a periodic or quasi-periodic manner according to a first period smaller than said first central wavelength, and furthermore comprising a dielectric material layer of given thickness and given refractive index, coupled with the metallic grating to form a waveguide for the waves diffracted by the grating, said first period of the grating being suitably adapted so that only orders 0 and ±1 of a wave at normal incidence and wavelength $\lambda_0$, are diffracted in the dielectric material layer, the dielectric layer and grating assembly being suspended, in use, in a fluid of refractive index close to 1.

According to a first variant, the metallic grating is one-dimensional with a single assembly of parallel slits, forming a polarizing bandpass filter.

According to a second variant, the metallic grating is two-dimensional, furthermore comprising a second assembly of substantially identical, parallel slits, spaced apart in a periodic or quasi-periodic manner according to a second period, the slits of the second assembly of slits being arranged in a different direction from those of the slits of the first assembly.

According to an example of the second variant, the width of the slits of the second assembly of slits is substantially identical to that of the slits of the first assembly of slits and the two periods are identical. When the slits of the two assemblies of slits are perpendicular, the filter thus produced is strictly non-polarizing.

According to another example of the second variant, the two periods are different and the filter is optimized for the filtering of an incident wave at at least one first and one second central wavelength $\lambda_{01}$ and $\lambda_{02}$: the first and second periods are smaller than the first and second wavelengths respectively, and the period along each of the dimensions is suitably adapted so that only orders 0 and 1 of a wave at normal incidence and wavelength $\lambda_{01}$ or $\lambda_{02}$ respectively are diffracted in the dielectric material layer. The filter thus obtained is polarizing and the filtered wavelength depends on the polarization.

According to a third variant, the metallic grating is two-dimensional, comprising a plurality of assemblies of substantially identical, parallel slits, spaced apart in a periodic or quasi-periodic manner, the slits of each of the assemblies of slits being arranged along different directions to form a pattern repeated along two directions, the pattern being for example hexagonal or parallelogram-shaped.

According to one or the other of the variants, the dielectric material layer can be structured according to a pattern substantially similar to that formed among the slits of the grating.

The thickness of the dielectric layer can be sufficiently thin to permit only a single guided mode in the dielectric layer at said at least one first central wavelength.

Alternatively, the thickness of the dielectric layer is sufficiently thick to allow the propagation of several guided modes in the dielectric layer, allowing the production of a filter exhibiting several central transmission wavelengths.

According to an example, the material forming the dielectric layer comprises one of the materials chosen from among silicon nitride, silicon carbide, silicon oxide, yttrium fluoride, zinc sulfide, aluminum oxide or magnesium oxide.

According to an example, the material forming the grating comprises one of the metals chosen from among gold, aluminum, copper, tungsten, nickel, platinum, silver.

According to an example, the central wavelength lies between substantially 0.850 µm and 30 µm.

According to a variant, the spectral filter furthermore comprises a substrate, the dielectric layer and metallic grating assembly being suspended on the rim of an orifice formed in said substrate.

According to a second aspect, the invention relates to a multispectral array comprising an assembly of spectral filters according to the first aspect, the gratings of said spectral filters being coupled with the same dielectric material layer, the dielectric layer and metallic gratings assembly of the filters being suspended on the rim of an orifice formed in one and the same substrate.

According to a third aspect, the invention relates to a near-infrared or infrared optronic detection system comprising a detector and a spectral filter according to the first aspect or a multispectral array according to the second aspect.

According to a variant, the optronic detection system furthermore comprises a polarizer making it possible to polarize an incident wave in a direction parallel to one of the directions of the slits of the or of at least one of the metallic grating(s).

According to a fourth aspect, the invention relates to a method for the fabrication of a filtering device according to the first or the second aspect comprising:
- the deposition on one of the faces of a substrate of a silica layer and on the other face of the substrate of a thin dielectric layer to form the waveguide,
- the deposition of the metallic grating or gratings on said dielectric material layer according to a given pattern,
- the etching of the silica at the rear face of the substrate according to a pattern defined by UV lithography or electron beam lithography, aligned with the pattern of the grating or gratings formed in the front face, and then the etching of the silicon substrate right across, according to the previous pattern, so as to obtain a suspended membrane formed of the dielectric layer and of the grating or gratings.

According to a first variant, the deposition of the metallic grating or gratings is obtained after UV lithography or electron beam lithography.

According to a second variant, the deposition of the metallic grating or gratings is obtained after nano-printing.

When the dielectric material layer is structured, the etching of said layer can also be obtained after UV lithography or electron beam lithography, or after nano-printing.

BRIEF DESCRIPTION OF THE DRAWINGS

Other advantages and characteristics of the invention will become apparent on reading the description, illustrated by the following figures.

DETAILED DESCRIPTION

Figure 1A:
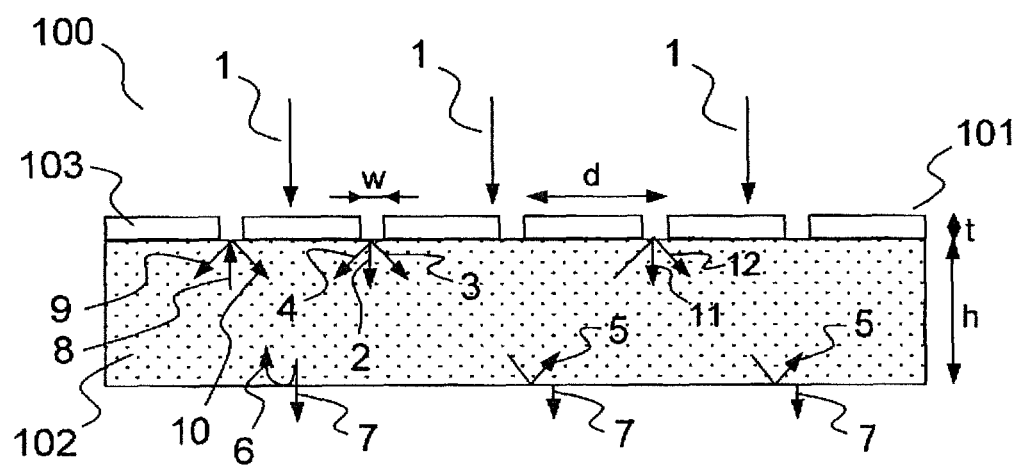
FIGS. 1A and 1B, a diagram illustrating the principle of a bandpass filter according to the invention and a variant of such a filter.
Figure 2A:
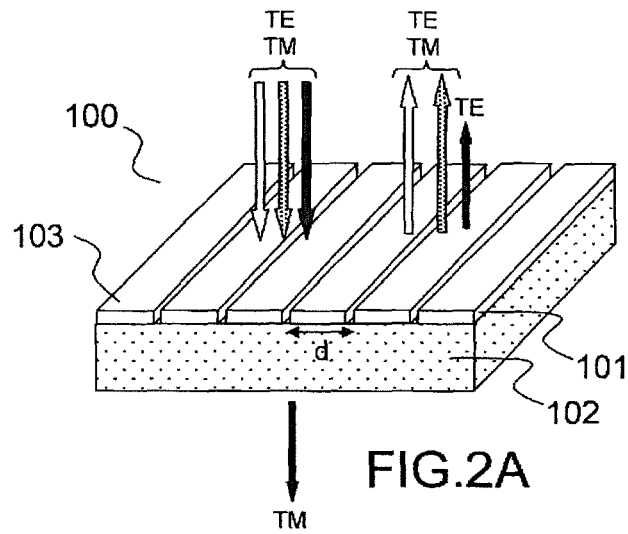
FIGS. 2A to 2C, three exemplary embodiments of a bandpass filter according to the invention.
Figure 2B:
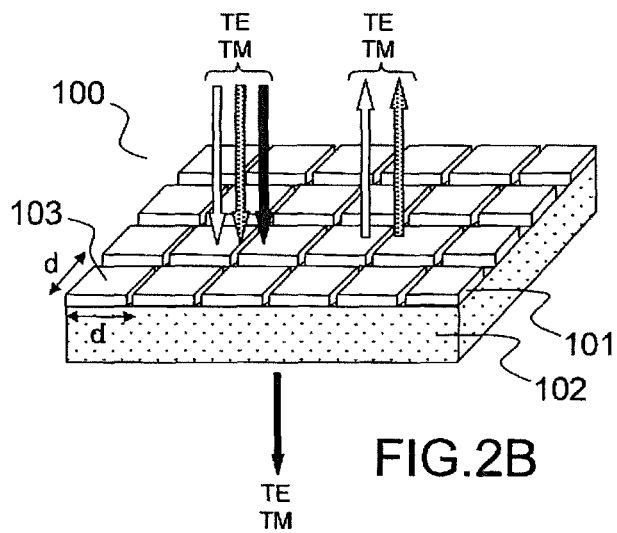
Figure 2C:
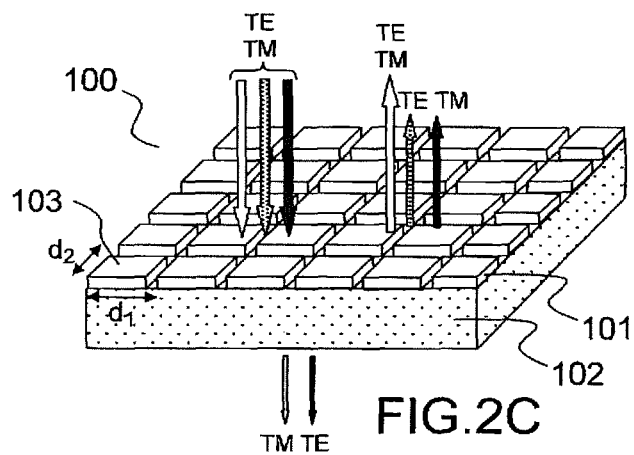

FIG. 1A illustrates by a diagram the principle of an exemplary bandpass filter 100 according to the invention (sectional view) while FIGS. 2A to 2C represent perspective views of various exemplary embodiments. The filter 100 comprises a thin layer 102 of dielectric material on which is deposited a metallic film 101 perforated periodically, in one or more directions, by a sub-wavelength pattern 103, the whole being suspended, that is to say not deposited on a substrate except in zones where the spectral filtering functionality is not sought. For example, the metallic film and dielectric layer assembly is suspended on the rim of an orifice formed in a substrate (not represented in FIG. 1A). In use, the structure is therefore immersed in the ambient medium (vacuum or arbitrary fluid). The layer 102 is made of dielectric material transparent in the spectral band that one seeks to transmit, for example silicon nitride or silicon carbide. Other materials can be used such as for example silicon oxide, yttrium fluoride, zinc sulfide, aluminum oxide or magnesium oxide. The metallic film is for example gold, aluminum, copper, tungsten, nickel, platinum or silver, it being possible for the choice of the metal to be made so as to minimize the absorption in the spectral range of use. The elementary pattern 103 which is repeated in a periodic or quasi-periodic manner (that is to say with a slowly varying period) can comprise one or more narrow slits stretching right across the pattern. The grating can comprise an assembly of parallel slits (case for example of FIG. 2A) or two or more assemblies of parallel slits (case for example of FIGS. 2B and 2C for two assemblies of slits).

The principle of the filter relies on the confinement of an incident wave 1 (FIG. 1A) in the dielectric layer 102 which serves as waveguide, and then on its transmission in the output space (referenced output wave 7 in FIG. 1A). Trapping followed by transmission are obtained by virtue of the metallic diffracting structure 101 deposited on one of the faces of the waveguide 102, said structure moreover being suitable for the control of the polarization, as will be described subsequently. More precisely, the incident photons (symbolized by the arrow 1) are transmitted in the dielectric material layer 102 by diffraction through the metallic grating 101. This diffraction may take place at order 0, ±1, etc. The applicants have shown that by choosing the optogeometric parameters of the diffracting structure in such a way that in the spectral range of the filter, only orders 0 and ±1 of a wave at normal incidence are diffracted, it was possible to obtain excellent selectivity. Indeed, while the diffracted photons at order 0 (symbolized by the arrow 2), at normal incidence with respect to the plane of the waveguide, are partially transmitted outside of the dielectric layer (arrow 7) and partially reflected still at normal incidence (6, 8) so that they are again diffracted under the grating (arrows 9, 10), orders ±1 (indicated by the arrows 3, 4) are guided in the layer 102, especially by total internal reflection (arrow 5), and can only emerge by diffraction under the grating (arrows 11, 12). By virtue of the constructive interference of the emergent photons 7, transmission peaks appear for certain wavelengths. Typically, to limit the diffraction and the propagation of orders 0 and ±1, the period d of the diffracting structure can be chosen such that $d<\lambda_0<n_g d$, where $\lambda_0$ is the central wavelength of the spectral band that one seeks to filter, typically between 0.850 μm and 30 μm for near-infrared and infrared applications, and $n_g$ is the index of the dielectric material measured at this wavelength. Moreover, the metallic grating and dielectric layer assembly being suspended, that is to say immersed in use in an ambient medium, for example vacuum or another fluid of index close to 1, the choice of the dielectric material so as to obtain the condition of total internal reflection at the dielectric/ambient medium interface is facilitated and the spurious reflections related to the presence of a substrate are eliminated, making it possible to maximize the luminous flux emitted into free space.

Figure 1B:
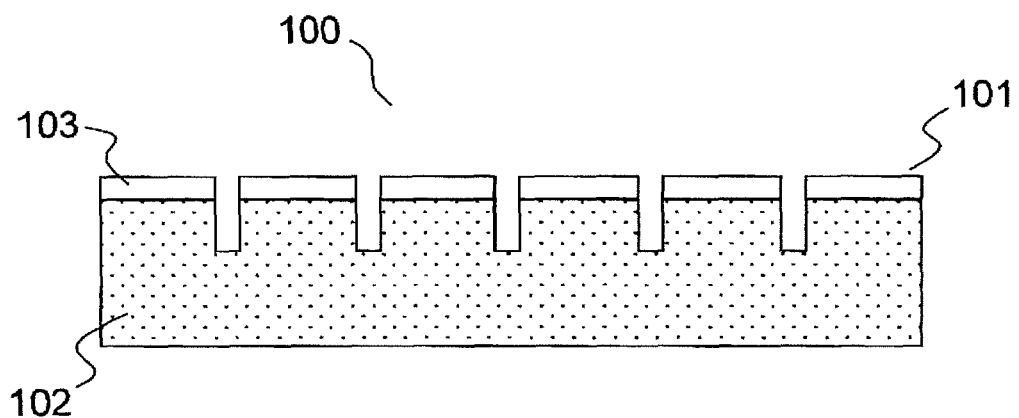

According to a variant illustrated by the example of FIG. 1B, the dielectric material layer can be structured according to a pattern similar to that of the slits forming the grating (on one side and/or on the other of the dielectric layer). The applicants have shown that increased efficiency was obtained.

The applicants have moreover shown that by choosing at one and the same time a sufficiently large thickness of the metallic grating and sufficiently narrow slits, only the TM polarization (magnetic field parallel to the slits) was able to be transmitted in the thin layer and then in free space, allowing perfect control of the polarization once the orientation of the assemblies of parallel slits has been adjusted. Typically, by choosing a thickness t of the grating such that $t > \lambda_0/50$ and a width w of the slits such that $w < \lambda_0/10$, the applicants have shown that it was possible to obtain a residual TE polarized transmission (electric field parallel to the slits) of less than 5% of the incident light in a bandpass filtering device such as described above.

Advantageously, the thickness t of the grating is chosen less than $\lambda_0/10$ to avoid possible phenomena of vertical resonances in the slits of the grating which would have a disturbing effect on the global transmission of the filter.

FIGS. 2A to 2C represent three examples of implementation for obtaining bandpass filters with controlled polarization.

The structure of FIG. 2A is termed a "polarizing one-dimensional configuration". In this example, the metallic diffractive structure is formed of an assembly of very thin parallel slits, making it possible to polarize the wave transmitted in TM mode. Thus, for a polychromatic and unpolarized incident wave, formed of a combination of TM polarized incident photons (magnetic field perpendicular to the sectional plane of the figure) and of TE polarized photons (electric field perpendicular to the sectional plane of the figure), only the TM polarized photons at the central wavelength $\lambda_0$ are transmitted by the filter. This configuration can allow, in addition to the filtering function, analysis of the polarization of the incident wave, for example by envisaging means of rotation of the filter or by deploying an assembly of filters exhibiting gratings whose slits are not oriented in the same direction, for example in the form of a multispectral array such as will be described hereinafter. If the incident wave comprises a hardware component with a prevalent linear polarization, this being for example the case for an infrared radiation emitted or reflected by an artificial object (of the vehicle or building type for example), the signal measured at the output of the filter will vary with the position of the filter or according to the filter in the case of a multispectral array. If the incident wave is purely unpolarized (typically the case for an infrared radiation emitted by a natural object, of the vegetation type), the signal at the output of the filter will be constant whatever the position of the filter or whatever the filter in the case of a multispectral array. Thus it is therefore possible to undertake analysis of the polarization of a scene.

According to a variant, the slits are spaced apart in a quasi-periodic manner, that is to say with a slowly varying period. Indeed, it is apparent that the filtering function is effective when the number of repetitions of the slits is at least equal to the quality factor of the filter, defined as the ratio of the central transmission wavelength to the mid-height spectral width. Thus typically, for a filter suitable for transmission at 6 µm and a mid-height spectral width of 0.2 µm, it will be sought to dispose at least thirty slits in the direction of periodicity. The applicants have shown that if the period varies slowly, that is to say by a value that is substantially smaller than the mid-height spectral width for a number of slits that is substantially equal to the quality factor, it was possible to preserve the filtering function while shifting the transmission wavelength. For example, the variation of the period can be a linear function of the distance, in the direction of periodicity of the pattern. It is then possible to produce for example for a spectro-imager function, a filter whose transmission wavelength $\lambda_0$ varies continuously from one end to the other of the filter, covering a whole spectral range.

The structure of FIG. 2B is termed a "non-polarizing two-dimensional configuration". In this example conversely, the bandpass filter is rendered purely non-polarizing by virtue of a perfectly symmetric diffracting structure. Thus the photons incident at the wavelength $\lambda_0$ are transmitted whatever their polarization. Accordingly, the slits of the diffractive structure are crossed, forming two assemblies of slits arranged in two advantageously perpendicular directions, and the period is identical in the two directions. The insensitivity to polarization in this example results as previously from the conditions of thickness of the metallic grating and of thinness of the slits, allowing in each of the directions perfect control of the polarization. Such a structure makes it possible in particular to transmit almost all the incident flux, and this may be a significant parameter in the case of an application to detection, when one seeks to maximize the detection signal.

The structure of FIG. 2C is termed a "polarizing two-dimensional configuration". As in the example of FIG. 2B, the slits are crossed and the conditions of thickness of the grating and of thinness of the slits are complied with so as to have, in each direction, perfect control of the polarization. In this example, however, the periods in one and the other of the directions are different (respectively $d_1$ and $d_2$) allowing a filtering function according to two spectral bands respectively centered on distinct wavelengths $\lambda_{01}$ and $\lambda_2$. Thus, the filter obtained is polarizing and the filtered wavelength depends on the polarization. Indeed, only the TM polarized incident photons (magnetic field perpendicular to the sectional plane of the figure) exhibiting a wavelength close to $\lambda_{01}$ will be transmitted by the filter, as will the TE polarized incident photons (electric field perpendicular to the plane of the figure) exhibiting a wavelength close to $\lambda_{02}$. Wavelength-adjustable filtering can for example be carried out by selecting the polarization of the incident wave, as will be described subsequently. Polarization analysis applications are also possible, like those described in the case of the one-dimensional polarizing filter.

Figure 3:
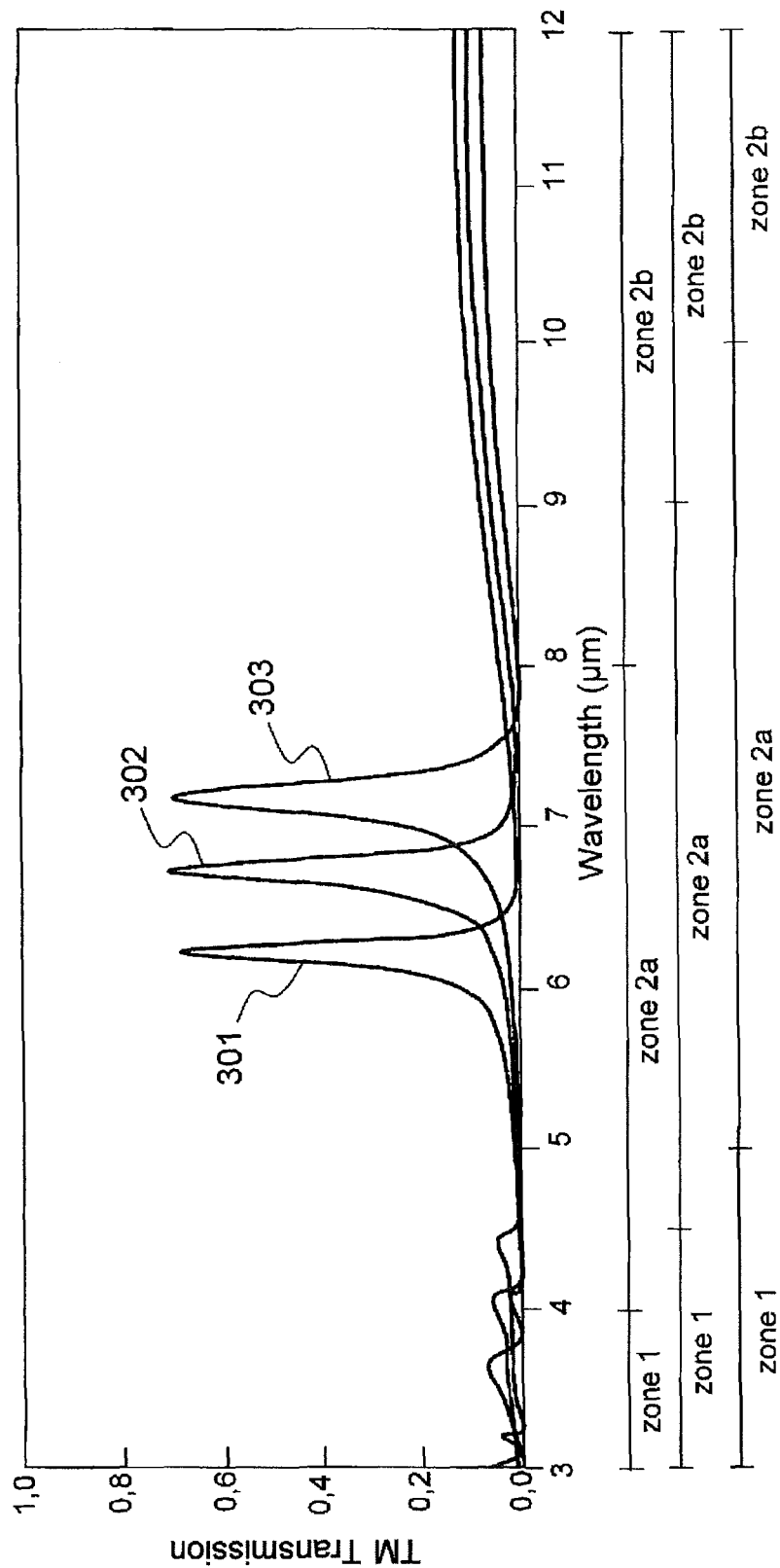
FIG. 3, curves showing the spectral response calculated for a bandpass filter of the type of FIG. 2A, for various values of period and of slit width.

FIG. 3 illustrates the spectral responses in transmission of a filter of the type of FIG. 2A, calculated for various values of the period d and of the width of the slits w. The filter is formed of a waveguide of thickness h and of optical index $n_g$ assumed equal to 2 on which a metallic film of optical index equal to that of gold (see "Handbooks of optical constants of solids", E D Palik, 1985) is deposited and perforated periodically in a single direction with slits. The calculations are performed using the Reticolo software, developed by J. P. Hugonin and P. Lalanne ("Reticolo software for grating analysis", Institut d'Optique, Orsay, France (2005)), and based on the theory of coupled waves (or RCWA, the abbreviation standing for the expression "Rigorous Coupled Wave Analysis"). FIG. 3 presents three transmission spectra, referenced respectively 301, 302 and 303, calculated at normal incidence under TM polarization for lengths of the incident wave varying between 3 µm and 12 µm, for three structures of different geometry. The thickness of the thin dielectric layer is h=1.3 µm and the thickness of the grating t=0.2 µm for the three geometries. The elementary pattern is formed by a slit of width w equal to 0.25 µm, 0.3 µm and 0.35 µm respectively for curves 301, 302, 303. The pattern repetition period is d=4 µm, 4.5 µm, 5 µm respectively for curves 301, 302, 303. The simulations show a transmission value of close to 0.7 with a central wavelength, corresponding to the value of the wavelength for which the transmission is a maximum, which shifts from 6.225 µm (curve 301), to 6.725 µm (curve 302) and to 7.065 µm (curve 303). The width of the peak at mid-height varies from 140 nm (curve 301), to 185 nm (curve 302) and to 230 nm (curve 303). With reference to FIG. 1A and to the description of the physical principle, it is possible to explain the shape of these spectra by dividing the spectral band over a scale with three zones (zone 1, zone 2a and zone 2b). In FIG. 3, the upper scale corresponds to curve 301 (d=4 µm, w=0.25 µm), the middle scale corresponds to curve 302 (d=4.5 µm, w=0.3 µm) and the lower scale corresponds to curve 303 (d=5 µm, w=0.35 µm). Zone 1 corresponds to the span of the wavelengths that are smaller than the period ($\lambda$<d). For this span, the structure diffracts several orders and the intensity in order 0 is low. Zone 2 is subdivided into two zones (zone 2a and zone 2b) on either side of a critical wavelength $\lambda_c$ whose expression is given by the law of gratings. At normal incidence, $\lambda_c = n_g d$, where $n_g$ is the index of the dielectric material forming the waveguide (for the calculations on gratings see for example J. D. Jackson, "Electrodynamique classique—$3^{rd}$ edition", Dunod (2001)). In zone 2a ($\lambda<\lambda_c$), the grating diffracts orders 0 and ±1 in the dielectric. As was explained with reference to FIG. 1A, the waves diffracted according to order ±1 are guided and exit the guide only on condition of being at normal incidence again. This occurs during the diffraction upon reflection under the grating. For certain wavelengths, the waves interfere constructively thus forming the transmission peak at the central wavelength $\lambda_0$, which is shown to be strongly related to the period of the grating. In zone 2b ($\lambda>\lambda_c$), there is only order 0 diffraction in the waveguide. There is therefore no waveguide trapping, preventing significant transmission.

In the example of FIG. 3, the thickness and the index of the dielectric layer are such that there is only a single guided mode in the spectral zone of the filter, allowing very good selectivity around a single central wavelength. This property is satisfied if the condition:

$$h < \frac{\lambda}{2\sqrt{n_g^2 - n_{ext}^2}}$$

is satisfied, where h is the thickness of the dielectric layer, $n_g$ the index of the guide and $n_{ext}$ the refractive index of the ambient medium. This results in a transmission spectral response exhibiting a single peak.

By increasing the thickness of the dielectric layer, conversely the propagation of several guided modes and therefore the possibility of several transmission peaks is enabled.

In the example described hereinabove, on account of the thickness of the metallic grating and of the thinness of the slits, only the TM polarization can be transmitted. Moreover, the trapping in the guide in such a structure is particularly effective on account of the metallic nature of the grating and of the thinness of the slits. The TE polarization is for its part very predominantly reflected, whatever the wavelength. These spectra can be generalized to an unpolarized incident wave for a structure having crossed slits ("non-polarizing two-dimensional configuration", of the type of FIG. 2B). The various geometries can be combined in one or the other direction of the plane of the structure to obtain a polarizing two-dimensional configuration (FIG. 2C). Thus, the applicant has shown that the properties of the photons trapped in the guide (wavelength, polarization) are directly related to the optogeometric parameters of the structure such as the thickness and the nature of the metallic film, the shape, the dimension and the periodicity of the perforations, the thickness and the nature of the waveguide. The spectral characteristics of the bandpass filter according to the invention can therefore be adjusted by varying the parameters hereinabove.

The curves calculated in the example described in FIG. 3 make the assumption of a wave incident at normal incidence. According to a variant, it is possible to work with a nonzero incidence, the effect of which will be to displace the transmission peak if the angle of incidence defined with respect to the normal to the plane of the grating remains small, the constructive interference conditions no longer being the same. If the angle of incidence increases, a splitting of the transmission peak will be observed, to the detriment of the selectivity of the filter.

Figure 4A:
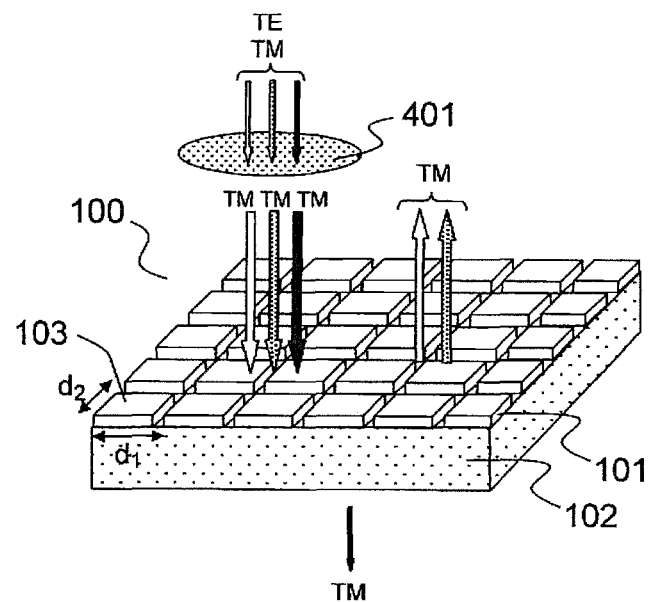
FIGS. 4A, 4B examples of implementation of a bandpass filter of the type of FIG. 2C.
Figure 4B:
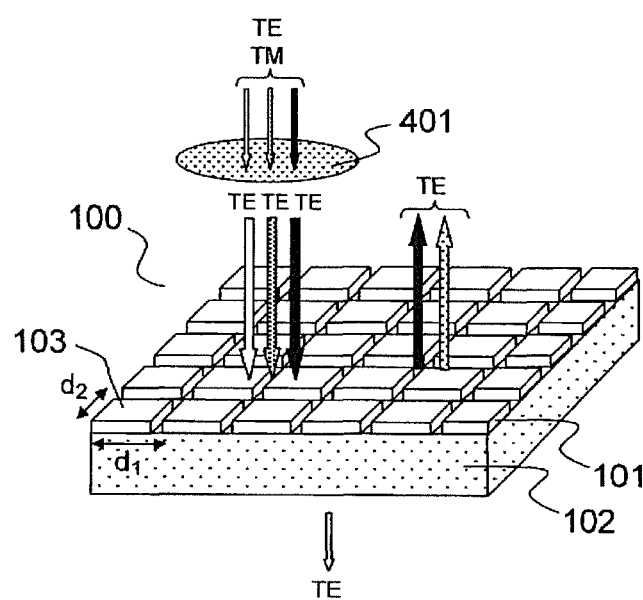

FIGS. 4A and 4B show an exemplary application of a bandpass filter of the type of FIG. 2C. This entails a filtering device comprising a bandpass filter 100 of the type of FIG. 2C, that is to say a polarizing two-dimensional configuration, the slits being arranged according to a first and a second direction with different periods $d_1$ and $d_2$. In the example of FIG. 4A there is envisaged a polarizer 401 making it possible to polarize in TM mode a wave incident on the filter (magnetic field perpendicular to the sectional plane of the figure). The spectral window transmitted is therefore centered on $\lambda_{01}$ corresponding to the grating of period $d_1$. In the example of FIG. 4B, the polarizer 401 is suitable for polarizing in TE mode the wave incident on the filter (electric field perpendicular to the plane of the figure). The spectral window transmitted is then centered on $\lambda_{02}$ corresponding to the grating of period $d_2$. It is therefore possible with such a device to select one or the other of the spectral windows by selecting the polarization.

Figure 5A:
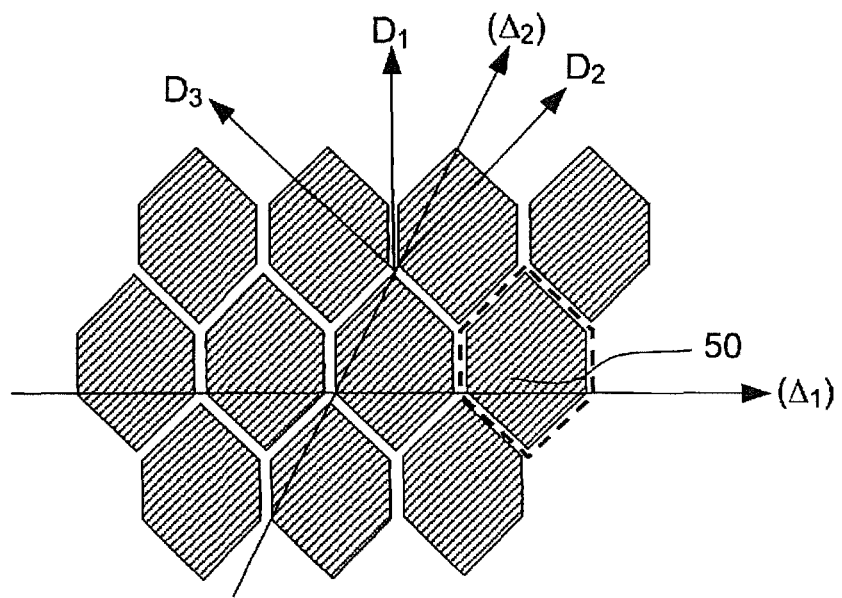
FIGS. 5A, 5B examples of two-dimensional gratings exhibiting hexagonal and parallelogram-shaped patterns respectively.
Figure 5B:
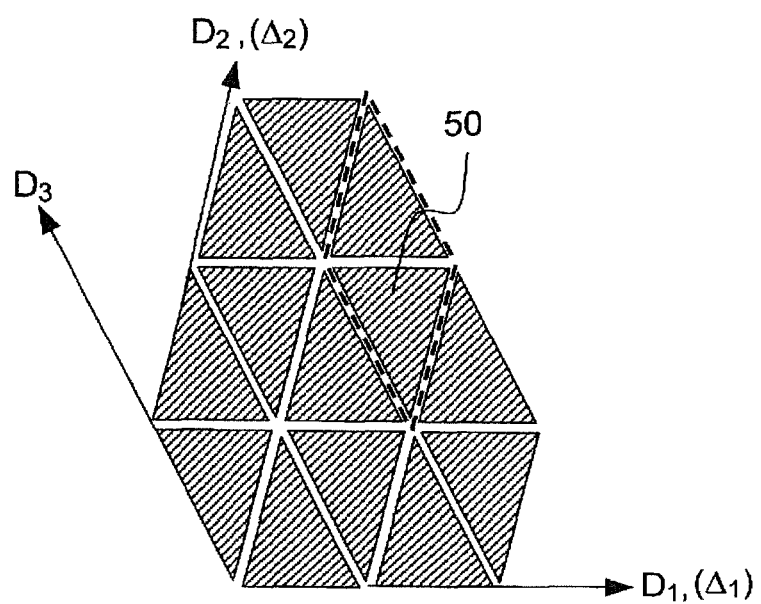

FIGS. 5A and 5B illustrate two exemplary embodiments of spectral filters according to the invention in which the gratings comprise a plurality of assemblies of substantially identical, parallel slits, the slits of each of the assemblies of slits being arranged in three different directions ($D_1$, $D_2$, $D_3$) to form a hexagonal pattern 50 (FIG. 5A) or parallelogram-shaped pattern (FIG. 5B) repeated in two directions $\Delta_1$, $\Delta_2$. The pattern is repeated in a periodic or quasi-periodic manner in each of the directions $\Delta_1$, $\Delta_2$. An advantage of this structure is to limit the effect of the incidence of the wave on the filter while preserving low sensitivity to polarization.

Figure 6:
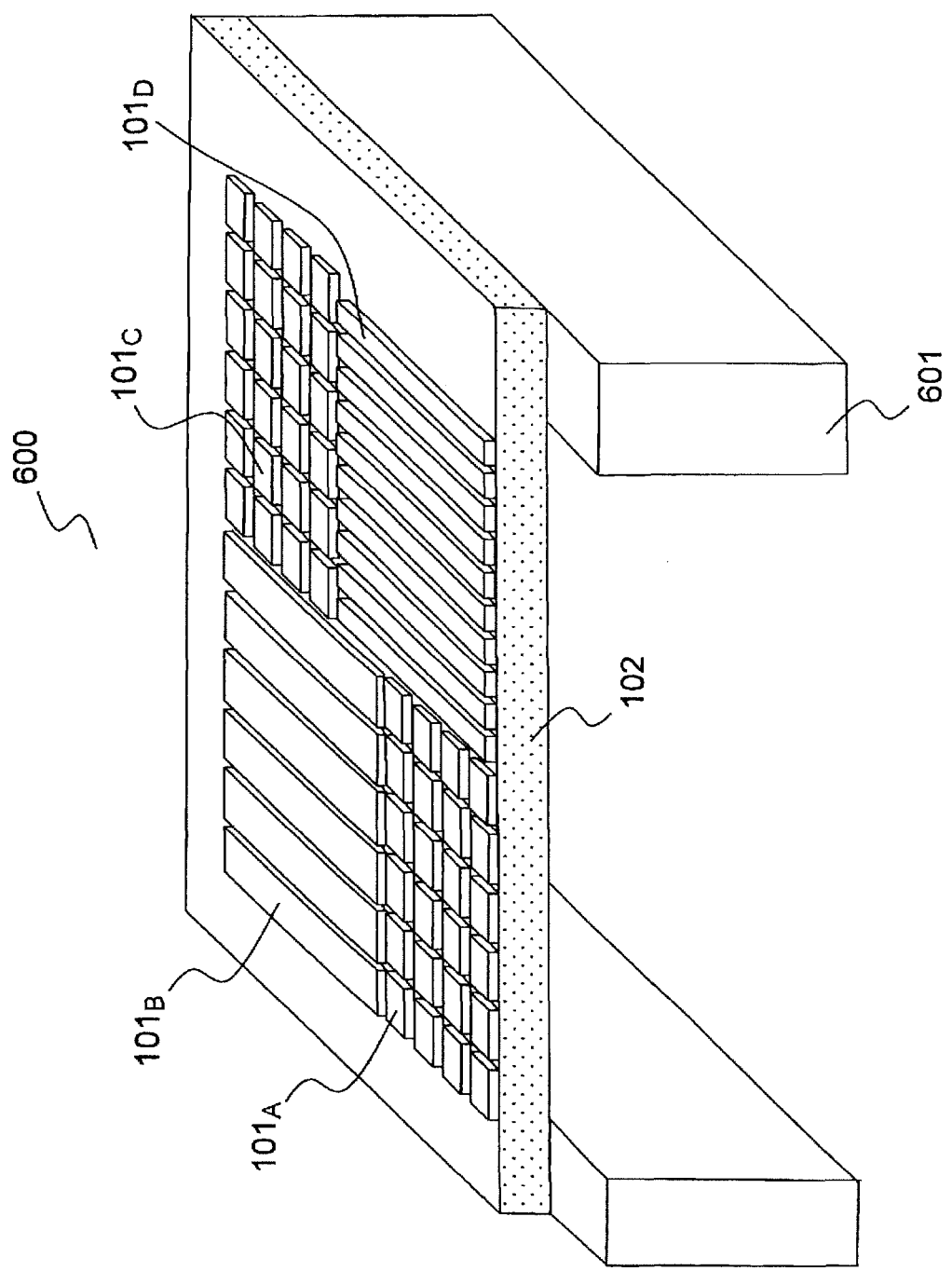
FIG. 6, a diagram of an exemplary multispectral array comprising a plurality of bandpass filters according to the invention.

FIG. 6 shows an exemplary embodiment of a filtering device comprising several bandpass filters forming a matrix of filters, or multispectral array. The assembly consisting of the dielectric layer 602 and metallic gratings, referenced $101_A$ to $101_D$, of the filters is suspended on the rim of an orifice formed in one and the same, for example silica, substrate 601. In this example, the matrix comprises polarizing one-dimensional filters ($101_B$, $101_D$) with different periods and therefore different filtering wavelengths as well as polarizing or non-polarizing two-dimensional filters ($101_A$, $101_C$). This type of device, integrated into an imaging system, allows for example imaging or spectrometry applications, or polarization analysis applications. Moreover, the matrix of filters which is thus obtained does not exhibit any thickening from one filter to another, as would have been the case for a matrix of interferential filters for example, the central filtering wavelength resulting from the optogeometric parameters of the grating and not from a more or less significant stack of layers.

Figure 7:
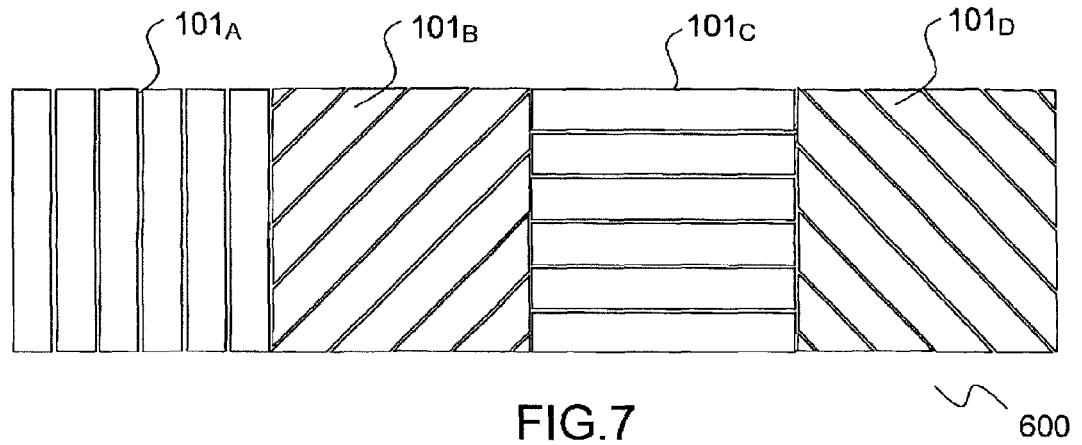
FIG. 7, a diagram showing an arrangement of gratings in an exemplary multispectral array.

FIG. 7 represents a view from above of a multispectral array 600 according to an exemplary embodiment. In this example, the array comprises an assembly of filters whose gratings $101_A$ to $101_D$ each comprise a single assembly of parallel slits, of identical period, but the orientation of whose slits varies from one filter to another, for example 0°, 30°, 60°, 90°. This array allows for example an analysis of the polarization of a scene, by envisaging means for moving it past the detection device.

A filtering device according to the invention can be fabricated by various processes. Advantageously, it is produced by adapting the process described in G. Vincent et al., "Large-area dielectric and metallic freestanding gratings for midinfrared optical filtering applications", J. Vac. Sci. Technol. B 26, 1852 (2008) allowing the production of suspended structures. A substrate of silicon, for example two-faced polished silicon, with crystalline orientation 100 is selected and then a silica layer (typically 500 nm) is deposited on one of the faces of the substrate ("rear face") for example by PECVD (Plasma Enhanced Chemical Vapor Deposition) or by sputtering. On the other face of the substrate ("front face"), a thin dielectric layer is deposited to form the waveguide (this entails for example a silicon nitride layer deposited by PECVD). A step of adjusting the mechanical stresses in the thin layer forming the waveguide can be carried out by undertaking annealings (typically, one hour at 400° C. for nitride deposited by PECVD). The metallic grating is then deposited on the waveguide. This step comprises for example the deposition of a photoresist sensitive to UV radiation (for example AZ5214 from MicroChemicals) or to electrons (for example PMMA), the UV lithography or electron beam lithography of the desired pattern (1D or 2D grating of slits, etc.), the development of the irradiated photoresist, the deposition of metal, for example gold, according to the desired thickness, and finally lift-off (removal of the photoresist and of the metal that is not desired) in a suitable solvent for example acetone for the photoresist AZ5214 or trichloroethylene for PMMA). According to a variant, a nano-printing technology (or 'nanoimprint') can also be used to form the metallic grating instead of electron beam lithography for example, nano-printing technology being cheaper to employ. The suspended membrane is thereafter obtained by deposition on the rear face of a photoresist sensitive to UV radiation (for example AZ5214) or to electrons (for example PMMA), the UV lithography or electron beam lithography of the desired pattern (square, rectangular, etc., opening) while taking care to be aligned with the pattern of the front face, the development of the irradiated photoresist, the etching of the silica left free after development, doing so with the aid of a solution based on hydrofluoric acid (in this zone the silica gives way to the silicon), the removal of the photoresist by a suitable solvent, the passing of the sample into a solution of TMAH (tetramethylammonium hydroxide) so as to etch the silicon substrate.

According to a variant, in the case where the dielectric layer is structured (such as is illustrated for example in FIG. 1B), the etching of said layer is undertaken thereafter, for example by plasma etching.

The process thus described makes it possible to produce a single bandpass filter, or a matrix of filters such as is described for example in FIG. 6. The filters of the matrix can then be produced by the process described on one and the same substrate, as simply and without noticeable cost overhead with respect to a single filter, only the step of defining the pattern of the grating being modified.

Figure 8:
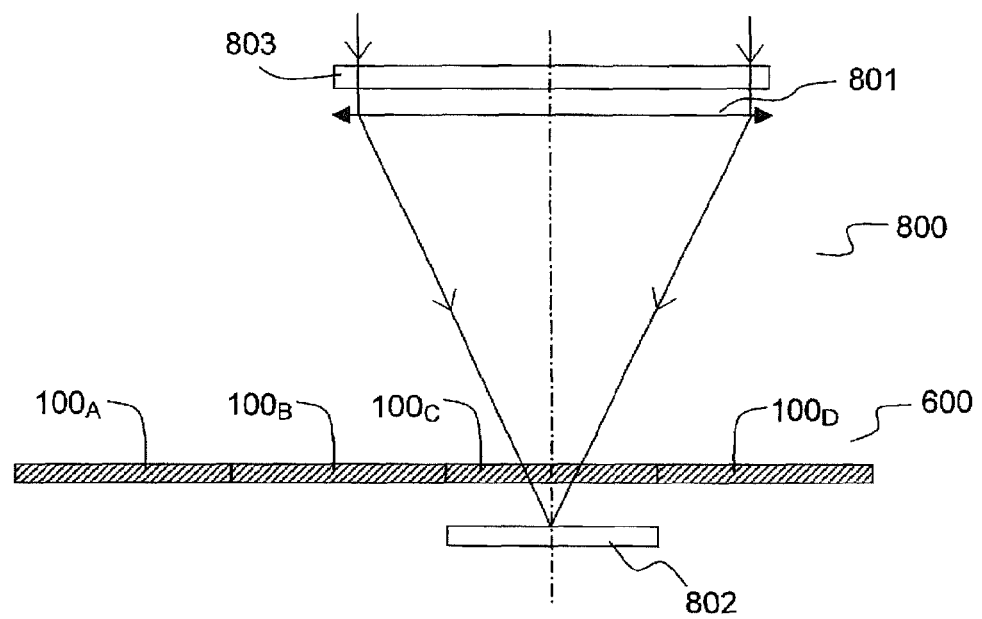
FIG. 8, a diagram showing an optronic detection system integrating a spectral filter according to the invention.

FIG. 8 represents in a schematic manner an optronic detection system implementing a spectral filter or a multispectral array 600 such as described above, and comprising an assembly of spectral filters referenced $100_A$ to $100_D$, the filters being used in transmission. The system generally comprises an objective 801 and a detector 802 suitable for the spectral band of interest. The array 600 is positioned in front of the detector and means (not represented) can be envisaged for displacing it, thus making it possible to work with one or the other of the filters, for example in a polarization analysis application. According to a variant, a polarizer 803 is arranged in the system so as to select a polarization and thus select a central wavelength of transmission as this was described previously for example in the example of FIGS. 4A, 4B. Alternatively, the optical system can comprise a juxtaposition of objectives, each of them facing a filter of the array 600 and a zone of a detection array 802 of greater dimensions than that represented in FIG. 8. According to this variant, the array 600 remains fixed in the system.

Although described through a certain number of detailed exemplary embodiments, the structure and the method for producing the spectral filter according to the invention comprises alternative variants, modifications and improvements which will be apparent in an obvious manner to the person skilled in the art, it being understood that these alternative variants, modifications and improvements form part of the scope of the invention, such as defined by the claims which follow.

The invention claimed is:

1. A bandpass spectral filter, optimized for the transmission of an incident wave at at least one first central wavelength $\lambda_0$, comprising:
    a metallic grating of thickness (t) greater than about $\lambda_0/50$ and comprising at least one first assembly of substantially identical, parallel slits of width (w) smaller than about $\lambda_0/10$, spaced apart in a periodic or slowly varying period manner according to a first period smaller than said first central wavelength; and
    a dielectric material layer of thickness (h) and given refractive index ($n_g$), coupled with the metallic grating to form a waveguide for the waves diffracted by the grating, said first period of the grating being suitably adapted so that only orders 0 and ±1 of a wave at normal incidence and wavelength $\lambda_0$ are diffracted in the dielectric material layer, the dielectric layer and grating assembly being suspended, in use, in an ambient medium whose refractive index close to 1 so as to obtain a condition of total internal reflection at a dielectric layer-ambient medium interface.

2. The spectral filter as claimed in claim 1, in which the metallic grating comprises a second assembly of substantially identical, parallel slits, spaced apart in a periodic or slowly varying period manner according to a second period, the slits of the second assembly of slits being arranged in a different direction from that of the slits of the first assembly.

3. The spectral filter as claimed in claim 2, in which the width of the slits of the second assembly of slits is substantially identical to that of the slits of the first assembly of slits and the two periods are identical.

4. The spectral filter as claimed in claim 2, optimized for the filtering of an incident wave at least one first and one second central wavelength $\lambda_{01}$ and $\lambda_{02}$, in which the two periods are different, smaller than the first and second wavelengths respectively, the period along each of the dimensions being suitably adapted so that only orders 0 and 1 of a wave at normal incidence and wavelength $\lambda_{10}$ or $\lambda_{02}$ respectively are diffracted in the dielectric material layer.

5. The spectral filter as claimed in claim 2, wherein the slits of said first and second assemblies of slits are perpendicular.

6. The spectral filter as claimed in claim 1, in which the metallic grating comprises a plurality of assemblies of substantially identical, parallel slits, spaced apart in a periodic or slowly varying period, the slits of each of the assemblies of slits being arranged along different directions to form a pattern repeated along two directions.

7. The spectral filter as claimed in claim 6, in which said pattern is hexagonal or parallelogram-shaped.

8. The spectral filter as claimed in claim 1, in which the dielectric material layer is structured according to a pattern substantially similar to that formed among the slits of the grating.

9. The spectral filter as claimed in claim 1, in which the thickness (h) of the dielectric layer is sufficiently thin to permit only a single guided mode in the dielectric layer at said at least one first central wavelength.

10. The spectral filter as claimed in claim 1, in which the thickness of the dielectric layer is sufficiently thick to allow the propagation of several guided modes in the dielectric layer.

11. The spectral filter as claimed in claim 1, in which a material forming the dielectric material layer comprises one of the materials chosen from among silicon nitride, silicon carbide, silicon oxide, yttrium fluoride, zinc sulfide, aluminum oxide or magnesium oxide.

12. The spectral filter as claimed in claim 1, in which a material forming the grating comprises one of the metals chosen from among gold, aluminum, copper, tungsten, nickel, platinum, silver.

13. The spectral filter as claimed in claim 1, in which said at least first central wavelength lies in one selected from the group consisting of: the near-infrared spectral band and the infrared spectral band.

14. The spectral filter as claimed in claim 1, further comprising a substrate, the dielectric layer and metallic grating assembly being suspended on the rim of an orifice formed in said substrate.

15. A near-infrared or infrared optronic detection system comprising a detector and a spectral filter as claimed in claim 14.

16. The optronic detection system as claimed in claim 15, further comprising a polarizer for polarizing an incident wave in a direction parallel to one of the directions of the slits of the or of at least one of the metallic grating(s) of the filter or filters.

17. A method for the fabrication of a spectral filter as claimed in claim 14, comprising:

the deposition on one of the faces of a substrate of a silica layer and on the other face of the substrate of a thin dielectric layer to form the waveguide, the deposition of the metallic grating or gratings on said dielectric material layer according to a given pattern, the etching of the silica at the rear face of the substrate according to a pattern defined by UV lithography or electron beam lithography, aligned with the pattern of the grating or gratings formed in the front face, and then the etching of the silicon substrate right across, according to the previous pattern, so as to obtain a suspended membrane formed of the dielectric layer and of the grating or gratings.

18. The fabrication method as claimed in claim 17, in which the deposition of the metallic grating or gratings is obtained after UV lithography or electron beam lithography.

19. The fabrication method as claimed in claim 17, in which the deposition of the metallic grating or gratings is obtained after nano-printing.

20. A multispectral array comprising an assembly of spectral filters as claimed in claim 1, the gratings of said spectral filters being coupled with the same dielectric material layer, the dielectric layer and metallic gratings assembly of the filters being suspended on the rim of an orifice formed in one and the same substrate.

* * * * *